United States Patent
Shim

(10) Patent No.: US 10,009,562 B1
(45) Date of Patent: Jun. 26, 2018

(54) IMAGE SENSOR INCLUDING ACTIVE PIXEL AREA AND DARK PIXEL AREA CORRECTION

(71) Applicant: Dongbu HiTek Co., Ltd., Bucheon-si (KR)

(72) Inventor: Hee Sung Shim, Seoul (KR)

(73) Assignee: Dongbu HiTek Co., Ltd., Bucheon-Si (KR)

( * ) Notice: Subject to any disclaimer, the term of this patent is extended or adjusted under 35 U.S.C. 154(b) by 0 days. days.

(21) Appl. No.: 15/665,866

(22) Filed: Aug. 1, 2017

(30) Foreign Application Priority Data

Dec. 16, 2016 (KR) ........................ 10-2016-0172673

(51) Int. Cl.
*H04N 5/335* (2011.01)
*H04N 5/365* (2011.01)
*H04N 5/378* (2011.01)
*H04N 5/361* (2011.01)
*H04N 5/3745* (2011.01)
*H04N 5/357* (2011.01)

(52) U.S. Cl.
CPC ......... *H04N 5/3655* (2013.01); *H04N 5/3575* (2013.01); *H04N 5/361* (2013.01); *H04N 5/378* (2013.01); *H04N 5/37455* (2013.01)

(58) Field of Classification Search
CPC ..... H04N 5/361; H04N 5/3655; H04N 5/3575
USPC ........................................................ 348/308
See application file for complete search history.

(56) References Cited

U.S. PATENT DOCUMENTS

| | | | | |
|---|---|---|---|---|
| 2005/0051627 | A1* | 3/2005 | Matushima | G06K 7/10881 235/454 |
| 2007/0139729 | A1* | 6/2007 | Lee | H04N 1/00002 358/483 |
| 2008/0075383 | A1* | 3/2008 | Wu | G06T 7/41 382/274 |
| 2011/0032391 | A1* | 2/2011 | Cheung | H04N 5/2176 348/241 |

* cited by examiner

*Primary Examiner* — Usman Khan
(74) *Attorney, Agent, or Firm* — Andrew D. Fortney; Central California IP Group, P.C.

(57) ABSTRACT

An image sensor may include a pixel array including an active pixel area including active pixels and a dark pixel area including dark pixels, an analog-to-digital conversion unit configured to generate a dark pixel data code by converting an analog output of each of the dark pixels and an active pixel data code by converting an analog output of each of the active pixels, an offset extractor configured to extract a final offset using the dark pixel data code, and a corrector configured to correct the active pixel data code using the final offset. The corrector outputs one of a correction pixel data code and a reference code as a corrected result from the active pixel data code and the reference code. The correction pixel data code is obtained by correcting the active pixel data code using the final offset.

20 Claims, 6 Drawing Sheets

IMAGE SENSOR INCLUDING ACTIVE PIXEL AREA AND DARK PIXEL AREA CORRECTION

This application claims the benefit of Korean Patent Application No. 10-2016-0172673, filed on Dec. 16, 2016, which is hereby incorporated by reference as if fully set forth herein.

BACKGROUND OF THE INVENTION

Field of the Invention

Embodiments of the present invention relate to an image sensor and a sensing method thereof.

Discussion of the Related Art

An image sensor is a semiconductor device that converts an optical image into an electrical signal and that has been used in digital cameras, mobile communication terminals, etc. Such an image sensor may include a plurality of unit pixels.

As the number of pixels of an image sensor increases and the size of the image sensor decreases, the size of the pixel decreases. Thus, influence of dark current, noise generated by the dark current, photon shot noise, and MOS device noise increases.

In a CMOS type image sensor, characteristics of an active device (for example, the deviation in a transistor threshold voltage Vth) may adversely affect an image signal. The deviation may have a fixed value with respect to each pixel, and may cause fixed pattern noise (FPN) in the image displayed on a screen or monitor. In particular, as the distance between adjacent pixels decreases, an abnormal output image may be generated due to column fixed pattern noise (CFPN) that is generated due to an offset of the pixels or in a processing circuit in one or more columns (e.g., each column) upon implementing an image.

SUMMARY OF THE INVENTION

Accordingly, embodiments of the present invention are directed to an image sensor capable of reducing or preventing column fixed pattern noise by an offset correction in a bright area of a subject, and a sensing method thereof.

Additional advantages, objects, and features of the invention will be set forth in part in the description which follows and in part will become apparent to those skilled in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose(s) of embodiments of the invention, as embodied and broadly described herein, an image sensor may include a pixel array including an active pixel area including active pixels and a dark pixel area including dark pixels, an analog-to-digital conversion unit configured to generate a dark pixel data code by converting an analog output of each of the dark pixels and an active pixel data code by converting an analog output of each of the active pixels, an offset extractor configured to extract a final offset using the dark pixel data code, and a corrector configured to correct the active pixel data code using the final offset. The corrector outputs one of a correction pixel data code and a reference code as a corrected result from the active pixel data code and the reference code, and the correction pixel data code is obtained by correcting the active pixel data code using the final offset. The dark pixel data code and the active pixel data code may each comprise digital data, and the corrector may compare the actor pixel data code and the reference code to determine whether the correction pixel data code or the reference code is output.

The reference code may be a full code of resolution of from the analog-to-digital conversion (ADC) unit. For example, the reference code may have the same number of bits as the maximum number of digital bits output by the ADC unit, and the value of each bit is 1.

The corrector may be configured to convert the active pixel data code into the reference code and/or output the reference code if the active pixel data code is greater than the reference code.

The corrector may be configured to output the correction pixel data code if the active pixel data code is less than or equal to the reference code.

The offset extractor may be configured to extract (i) a per-column dark offset, a global dark offset and per-row noise using the dark pixel data code and (ii) the final offset using at least one of the extracted per-column dark offset, global dark offset and per-row noise.

The analog-to-digital conversion unit may be configured to generate a (n+m)-bit digital code, where n is a natural number greater than 1 and m is a rational number satisfying $0<m<1$.

The image sensor may further include a memory configured to store the dark pixel data code and the active pixel data code from the analog-to-digital conversion unit.

The memory may include an (n+1)-bit storage space configured to store the active pixel data code.

The corrector may include a comparator configured to (i) compare the active pixel data code and the reference code and (ii) output a first signal and a second signal, a code converter configured to convert the active pixel data code into the reference code based on the first signal and output the reference code, and an offset corrector configured to correct the active pixel data code based on the second signal and output the corrected result.

According to another aspect of the present invention, an image sensor includes a pixel array including an active pixel area including active pixels and a dark pixel area including dark pixels, an analog-to-digital conversion unit configured to generate a dark pixel data code by converting an analog output of each of the dark pixels and an active pixel data code by converting an analog output of each of the active pixels, a memory configured to store the dark pixel data code and the active pixel data code from the analog-to-digital conversion unit, and a digital signal processor configured to extract a final offset using the dark pixel data code and correct the active pixel data code using the final offset. The digital signal processor is configured to output one of a correction pixel data code and a reference code as a corrected result based on a comparison of the active pixel data code and the reference code. The correction pixel data code is obtained by correcting the active pixel data code using the final offset, and the reference code is a full code of resolution of the analog-to-digital conversion (ADC) unit.

The image sensor may further include a column scanner configured to generate control signals to control the memory, and, based on the control signals from the column scanner, the memory may transmit the active pixel data code and the dark pixel data code to the digital signal processor.

The digital signal processor may include an offset extractor configured to extract the final offset using the dark pixel data code and a corrector configured to output one of the correction pixel data code and the reference code as the corrected result based on a comparison of the active pixel data code and the reference code.

The offset extractor may be configured to extract (i) a per-column dark offset, a global dark offset and per-row noise using the dark pixel data code and (ii) the final offset using at least one of the extracted per-column dark offset, global dark offset and per-row noise.

According to another aspect of the present invention, a method of sensing an image using an image sensor including a pixel array including active pixels and dark pixels includes acquiring analog outputs of the dark pixels and analog outputs of the active pixels, generating a digital dark pixel data code by converting each of the dark pixels, generating a digital active pixel data code by converting each of the active pixels, extracting a final offset using the dark pixel data code, and correcting the active pixel data code using the final offset. Correcting the active pixel data code includes outputting one of a correction pixel data code and a reference code as a corrected result based on a comparison of the active pixel data codes and the reference code. The reference code is a full code of resolution from the analog-to-digital conversion (ADC) unit (e.g., having the same number of bits as the maximum number of digital bits output by the ADC unit, in which the value of each bit is 1). The correction pixel data code is obtained by correcting the active pixel data code using the final offset.

Correcting the active pixel code may include converting the active pixel data code into the reference code and/or outputting the reference code when the active pixel data code is greater than the reference code.

Correcting the active pixel code may include outputting the correction pixel data code when the active pixel data code is less than or equal to the reference code.

Generating the dark pixel data code may include generating an (n+m)-bit digital code, where n is a natural number greater than 1 and m is a rational number satisfying 0<m<1.

It is to be understood that both the foregoing general description and the following detailed description of various embodiments are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle(s) of the invention. In the drawings.

DETAILED DESCRIPTION OF THE INVENTION

Figure 1:
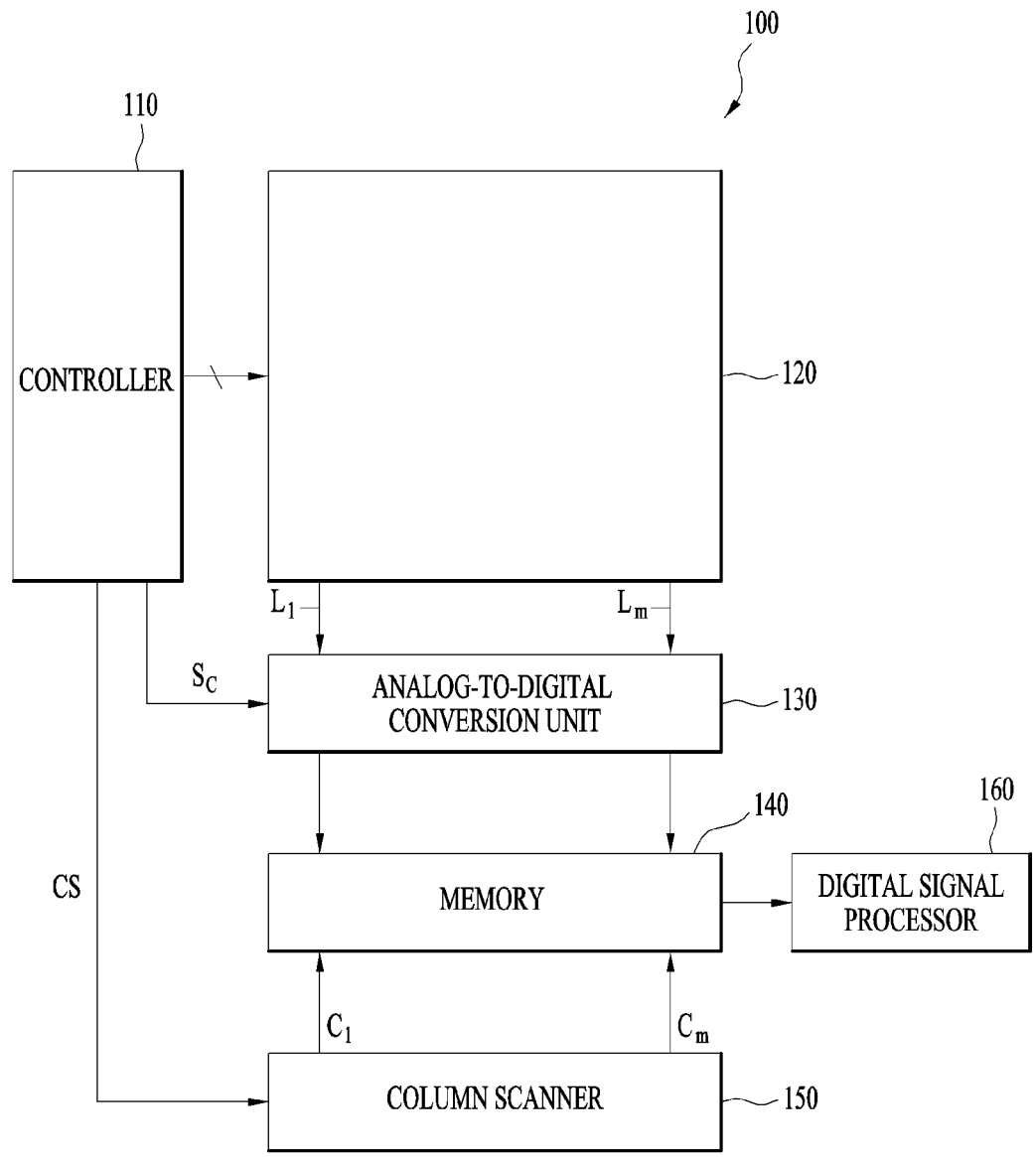
FIG. 1 is a diagram showing an exemplary configuration of an image sensor according to one or more embodiments.

Hereinafter, embodiments of the present invention will be clearly appreciated through the accompanying drawings and the following description thereof. In description of the embodiments, it will be understood that, when an element such as a layer, film, region, pattern or structure is referred to as being formed "on" or "under" another element, such as a substrate, layer, film, region, pad or pattern, it can be directly "on" or "under" the other element or be indirectly "on" or "under" the other element with intervening elements therebetween. It will also be understood that "on" and "under" the element is described relative to the drawings. In addition, the same reference numerals designate the same constituent elements throughout the description of the drawings.

FIG. 1 is a diagram showing the configuration of an image sensor 100 according to one or more embodiments of the present invention.

Referring to FIG. 1, the image sensor 100 includes a controller 110, a pixel array 120, an analog-to-digital conversion unit 130, a memory 140 and a column scanner 150.

The controller 110 outputs a first control signal $S_d$ configured to control the pixel array 120, a second control signal $S_c$ configured to control the analog-to-digital conversion unit, and a third control signal CS configured to control the column scanner 150.

For example, the first control signal $S_d$ may include a reset signal RX, a transmission signal TX and a selection signal SX configured to control reset, transmit and pixel selection operations in the pixels of the pixel array 120.

The controller 110 may include (i) a timing controller configured to generate a timing signal and/or a control signal, and (ii) a row driver configured to generate the first control signal $S_d$ configured to drive a plurality of unit pixels based on the timing signal from the timing controller, without being limited thereto. The first control signal Sd may be implemented in various manners capable of driving the plurality of unit pixels of the pixel array 120.

For example, the row driver may generate the drive signal $S_d$ configured to drive the pixel array 120 and output the generated drive signal to the pixel array 120.

For example, the row driver may output the drive signal $S_d$ configured to drive an active pixel area 205 (see FIGS. 2-3) and a dark area of the pixel array 120.

The pixel array 120 may include a plurality of unit pixels, and the plurality of unit pixels may be in a matrix including rows and columns. Each unit pixel may be a photoelectric transformation element configured to sense light and transform the sensed light into an electrical signal.

The pixel array 120 may include sensing lines L1 to Lm (m being a natural number greater than 1) connected to the unit pixels and configured to output sensing signals a1 to am (m being a natural number greater than 1). For example, each of the sensing lines L1 to Lm may be connected to output terminals of the unit pixels in a corresponding one of the columns.

The pixel array 120 may include an active pixel area, a first dark area (black area) at one or more sides of the active pixel area in a first (e.g., column) direction and a second dark area at one or more sides of the active pixel area in a second (e.g., row) direction orthogonal to the first direction.

The analog-to-digital conversion unit 130 converts the analog sensing signals from the pixel array 120 on the sensing lines L1 to Lm into digital signals and outputs a digital data code.

The analog-to-digital conversion unit 130 may also perform correlated double sampling (CDS). In one example, CDS may refer to a difference between first digital data and second digital data that is obtained. The first digital data is a digital signal that may be obtained by converting a first sensing signal output from a unit pixel, upon resetting the unit pixel and second digital data is a digital signal that may be obtained by converting a second sensing signal from the unit pixel corresponding to an external image signal.

For example, the analog-to-digital conversion unit 130 may include (i) a CDS processor configured to perform CDS and (ii) an analog-to-digital converter configured to convert an output of the CDS processor into a digital signal.

For example, although the CDS processor may include a switch, a capacitor and a differential amplifier, embodiments of the present invention are not limited thereto and may be variously implemented.

For example, although the analog-to-digital converter may include a ramp signal generator, a comparator and a counter, embodiments of the present invention are not limited thereto and may be variously implemented.

The analog-to-digital conversion unit 130 may generate dark pixel data codes by converting the analog outputs of the dark pixels of the dark area to digital data, and may generate active pixel data codes by converting to the analog outputs of the active pixels of the active area.

The memory 140 may store outputs from the analog-to-digital conversion unit 130 and transmit the stored outputs of the analog-to-digital conversion unit 130 to a digital signal processor 160 in response to control signals $C_1$ to $C_m$ of the column scanner 150.

For example, the memory 140 may include a plurality of latches (e.g., static random access memory cells) or a plurality of capacitors (e.g., one transistor-one capacitor random access memory cells, such as are typically found in dynamic random access memories).

The column scanner 150 may output the control signals $C_1$ to $C_m$ to control the memory 140 based on the control signal CS received from the controller 110. The dark pixel data codes and the active pixel data codes stored in the memory 140 may be read and transmitted to the digital signal processor 160 in response to the first control signals $C_1$ to $C_m$ from the column scanner 150.

The digital signal processor 160 processes the digital signals from the memory 140.

The digital signal processor 160 outputs one of a correction pixel data code and a reference code as a corrected result based on a comparison of the active pixel data code and a reference code. The correction pixel data code is the active pixel data code that is corrected using a final offset.

Although the digital signal processor 160 as shown is independent of the controller 110 in FIG. 1, embodiments of the present invention are not limited thereto. In other embodiments, the controller 110 may control and/or include the digital signal processor 160.

Figure 2:
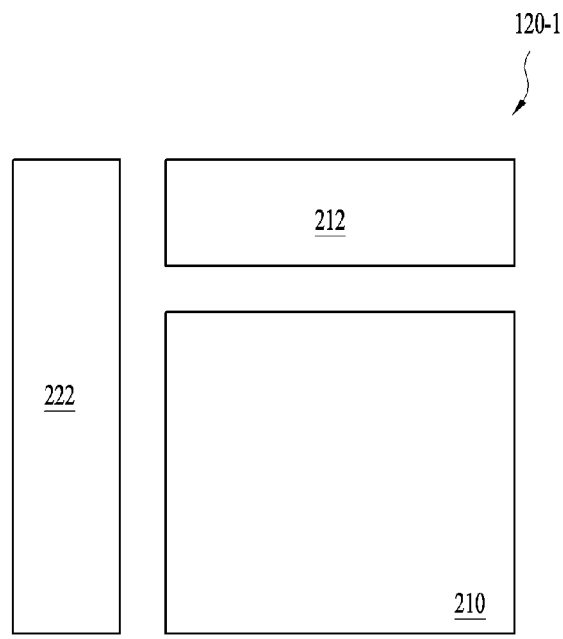
FIG. 2 is a diagram showing an exemplary embodiment of the pixel array shown in FIG. 1.

FIG. 2 is a diagram showing an embodiment 120-1 of the pixel array 120 shown in FIG. 1.

Referring to FIG. 2, the pixel array 120-1 includes an active pixel area 205, a first dark area 212 and a second dark area 222.

Although the first dark area 212 may be spaced apart from the active pixel area 205 and located adjacent to the active pixel area 205 (e.g., parallel with rows of the active pixel areas 205), embodiments of the present invention are not limited thereto. In another embodiment, the first dark area 212 may be spaced apart from the active pixel area 205 and located on an opposite side of the active pixel area 205.

Although the second dark area 222 may be spaced apart from the active pixel area 205 and located at a side of the active pixel area 205 adjacent to the side along which the active pixel area 205 is located (e.g., parallel with columns of the active pixel area 205), embodiments of the present invention are not limited thereto. In another embodiment, the second dark area 222 may be spaced apart from the active pixel area 205 and located on an opposite side of the active pixel area 205.

The active pixel area 205 may include a plurality of first pixels configured to convert incident light into an electrical signal using the photoelectric conversion properties of a photoreceptor (e.g., a photodiode). The plurality of pixels (hereinafter, referred to as "active pixels") may be arranged in a matrix.

The first and second dark areas 212 and 222 may be areas in which incident light is blocked. For example, each of the first and second dark areas 212 and 222 may be areas in which incident light is shielded by a metal layer or a reflective film.

For example, the first dark area 212 may include a plurality of pixels (hereinafter, referred to as "first dark pixels"), and the plurality of first dark pixels may be arranged in a matrix (e.g., where the number of columns is greater than the number of rows). In addition, the second dark area 222 may include a plurality of pixels (hereinafter, referred to as "second dark pixels"), and the plurality of second dark pixels may be arranged in a matrix (e.g., where the number of rows is greater than the number of columns).

Each column of the first dark area 212 may correspond to or be aligned with a corresponding one of the columns of the active pixel area 205. Each row of the second dark area 222 may correspond to or be aligned with a corresponding one of the rows of the first dark area 212 and the active pixel area 205.

In another embodiment, each row of the second dark area 222 may be aligned with a corresponding one of the rows of the active pixel area, and each column of the first dark area 212 may be aligned with a corresponding one of the columns of the active pixel area and the second dark area.

Figure 3:
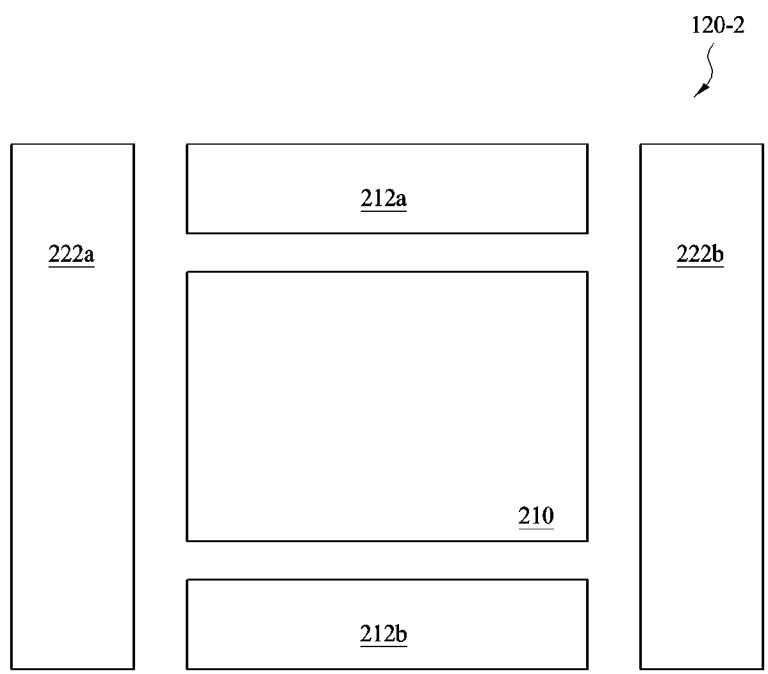
FIG. 3 is a diagram showing another exemplary embodiment of the pixel array shown in FIG. 1.

FIG. 3 is a diagram showing another embodiment 120-2 of the pixel array 120 shown in FIG. 1.

Referring to FIG. 3, the pixel array 120-2 includes an active pixel area 205, first dark areas 212*a* and 212*b* on first and third sides of (e.g., above and below) the active pixel area 205 and second dark areas 222*a* and 222*b* on second and fourth sides (e.g., at the left and right sides) of the active pixel area 205.

The pixel array 120-2 may further include dummy (e.g., inactive) pixel areas between the first and second dark areas 212*a*, 212*b*, 222*a* and 222*b* and the active pixel area.

Figure 4:
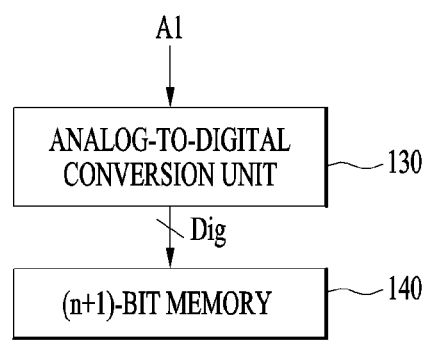
FIG. 4 is a diagram showing an exemplary embodiment of the analog-to-digital conversion unit and the memory shown in FIG. 1.

FIG. 4 is a diagram showing one or more embodiments of the analog-to-digital conversion unit 130 and the memory 140 shown in FIG. 1.

Referring to FIG. 4, the analog-to-digital conversion unit 130 may receive a sensing signal A1 (e.g., from the pixel array 120) as an analog signal and output a digital data signal Dig based on a value of the received analog signal.

The analog-to-digital conversion unit 130 may generate an (m+n)-bit digital code, in which n may be a natural number greater than 1, and m may be a rational number satisfying 0<m<1.

For example, n may equal 0 and m may equal 0.3, without being limited thereto.

Referring to FIG. 4, n may be related to the digital resolution of the analog-to-digital conversion unit 130 for the signal from the pixel array 120. For example, when the full code value of the digital resolution of the pixel array 120 is set to 1024, n=10.

In various embodiments, m may be determined based on the digital code value corresponding to the analog signal from the dark area. For example, when n=10 and the digital code value corresponding to the dark area is in a range of 1 to 36, m may be 0.3.

The digital code Dig generated and/or output by the analog-to-digital conversion unit 130 may be expressed as a $2^{(n+m)}$ binary code (e.g., a gray code). For example, when n=10 and m=0.3, the digital code Dig may have 1260 possible values, and the full code value of the digital code Dig may be 1260.

To store the digital code Dig expressed by the (n+m)-bit binary code (e.g., the active pixel data code), the memory 140 may include an (n+1)-bit unit storage space. For example, one digital code Dig generated and/or output by the analog-to-digital conversion unit 130 may be stored in one unit storage space of the memory 140.

For example, the memory 140 may comprise a line memory or register comprising (n+1) bits of data storage configured to store one active pixel data code.

Figure 5:
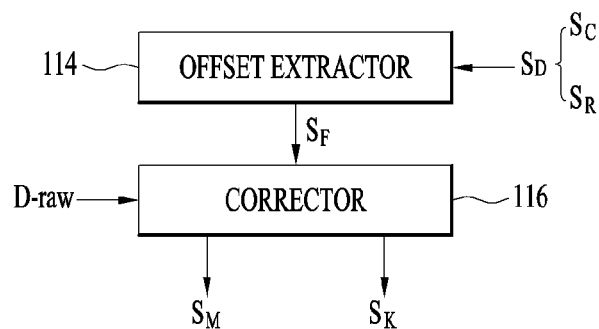
FIG. 5 is a diagram showing an exemplary configuration of an embodiment of the digital signal processor shown in FIG. 1.

FIG. 5 is a diagram showing an exemplary configuration of an embodiment of the digital signal processor 160 shown in FIG. 1.

Referring to FIG. 5, the digital signal processor 110 may include an offset extractor 114 and a corrector 116.

The offset extractor 114 may extract an offset using data codes (hereinafter, referred to as "dark pixel data codes") of dark pixels of the dark area.

For example, the offset extractor 114 may extract a final offset value $S_F$ configured to compensate for a dark level based on the output $S_D$ of the dark area 212 or 222 (or, alternatively, one or more of the dark areas 212a and 212b, or one or more of the dark areas 222a or 222b), as shown in FIG. 2 or FIG. 3, respectively.

For example, the offset extractor 114 may extract a final offset value $S_F$ configured to compensate for the dark level based on at least one of a first output $S_C$ of the first dark area 212 (or one or both of the first dark areas 212a and 212b) and a second output $S_R$ of the second dark area 222 (or one or both of the second dark areas 222a and 222b).

The offset extractor 114 may extract dark pixel data codes of the first and second dark areas, in which light may be blocked, and extract the final offset value $S_F$ configured to compensate for the dark level(s) (e.g., corresponding to the amount of light in the dark pixel[s]) using the extracted dark pixel data codes, in order to extract an offset configured to cancel noise due to the dark current of the pixel array 120. The dark current is generated regardless of the presence, absence or value(s) of an optical image.

The offset extractor 114 may extract a per-column dark offset value $S_{C2}$, a global dark offset value $S_G$, a per-row average $S_{R2}$, and a per-row noise value RN using the dark pixel data codes and may extract the final dark offset value $S_F$ using at least one of the per-column dark offset value $S_{C2}$, the global dark offset value $S_G$, the per-row average $S_{R2}$ and/or the per-row noise value RN.

Figure 6:
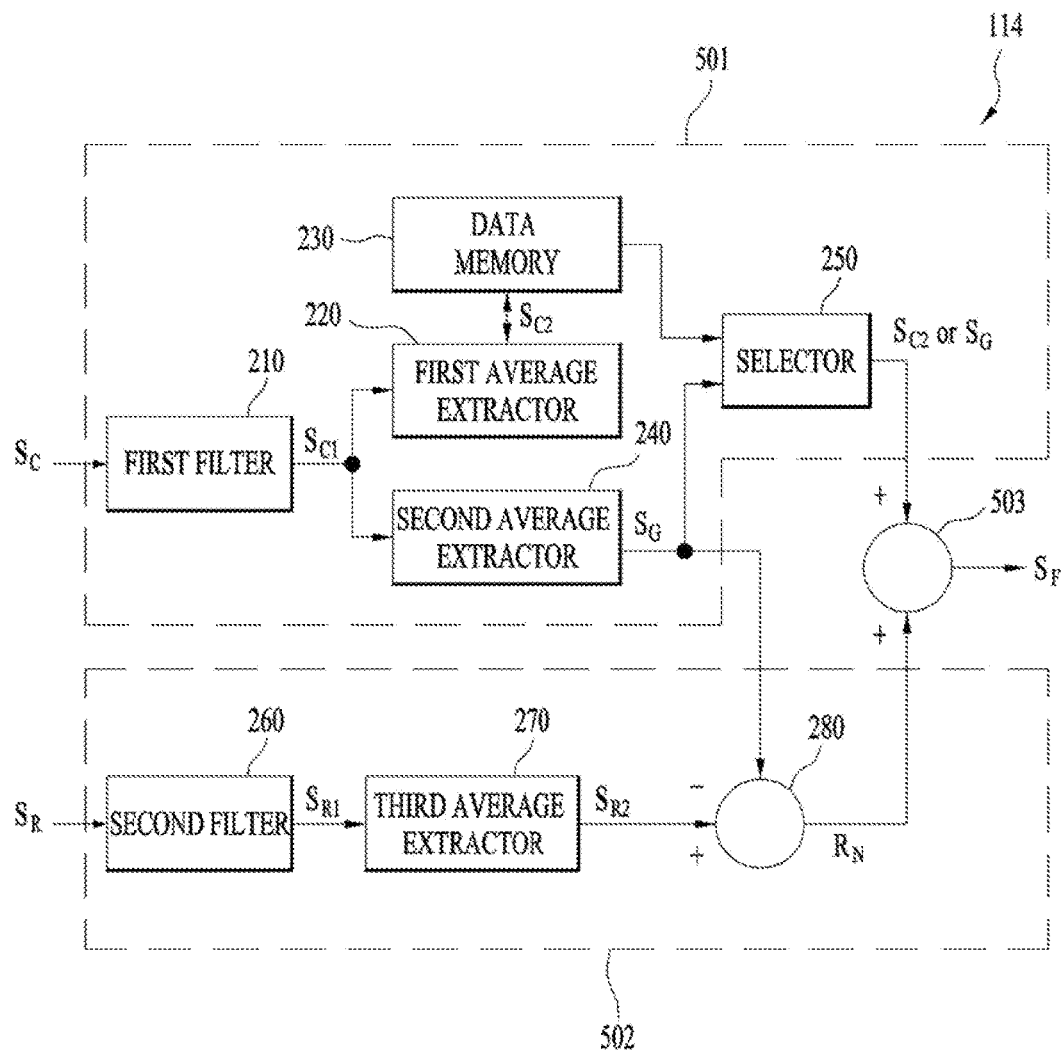
FIG. 6 is a diagram showing an exemplary embodiment of the offset extractor shown in FIG. 5.

The description of FIG. 6 is applicable to the definition of the per-column dark offset value $S_{C2}$, the global dark offset value $S_G$, the per-row average $S_{R2}$ and the per-row noise value RN.

For example, the offset extractor 114 may extract a per-column dark offset, a global dark offset, a per-row average and a per-row noise value. In addition, the offset extractor 114 may select one of the extracted per-column dark offset and the global dark offset, and extract the final dark offset by adding the selected dark offset to the per-row noise value.

For example, the first dark pixels of the first dark area 212 (or one or both of the first dark areas 212a and 212b) may be driven by the controller 110, and the per-column dark offset value $S_C$ and the global dark offset value $S_G$ may be extracted using the outputs of the first dark pixels acquired from the driven pixels.

Next, the second dark pixels of the second dark area 222 (or one or both of the second dark areas 222a and 222b) may be driven by the controller 110, and the per-row noise value RN may be extracted using the outputs of the second dark pixels acquired from the driven pixels.

FIG. 6 is a diagram showing an embodiment of the offset extractor 114 shown in FIG. 5.

Referring to FIG. 6, the offset extractor 114 may include a first offset extractor 501, a second offset extractor 502, and a calculator (e.g., an adder or subtractor) 503.

The first offset extractor 501 may extract the per-column dark offset and the global dark offset from or based on the first output $S_C$ of the first dark area 212 (or of one or both of the first dark areas 212a and 212b) and select and output one of the per-column dark offset value $SC_2$ and the global dark offset value $S_G$.

The first offset extractor 501 may include a first filter 210, a first average extractor 220, a memory 230, a second average extractor 240 and a selector 250.

The first filter 210 may filter the output $S_C$ of the first dark pixels of the first dark area 212 (or one or both of the first dark areas 212a and 212b), remove any outlier(s) from the output $S_C$ of the first dark pixels, and output filtered first dark pixels $S_{C1}$ (e.g., the first dark pixels with any outlier[s] removed).

The first dark area 212 (or the first dark areas 212a and 212b) may include a first dark pixel having a defect, which may generate an abnormal output or an outlier due to the defect. For example, the first dark area 212 (or the first dark areas 212a and 212b) may include a first dark pixel having an abnormally large output value due to a defect (e.g., a white defect) or a first dark pixel having an abnormally small output value due to a defect (e.g., a black defect). Such a defect may be generated in the semiconductor manufacturing process.

Here, the outlier(s) may be a value outside a predetermined range, where the predetermined range has a lower limit and an upper limit. For example, the first filter 210 may remove a value of a first dark pixel that is less than the lower limit and/or a value of the first dark pixel that is greater than the upper limit from the output $S_C$ of the first dark pixels.

The first filter 210 is responsible for removing abnormal outputs (e.g., outliers) of the first dark area 212 (or the first dark areas 212a and 212b) that may be due to a defect. The first filter 210 may comprise or be implemented by an outlier removal filter. By removing the outputs of the defective pixels, it is possible to improve dark level compensation accuracy. In other embodiments, the first filter 210 may be omitted.

The first average extractor 220 extracts an average $S_{C2}$ of the first dark pixels of each column of the first dark area 212 (or one or both of the first dark areas 212a and 212b) using the output $S_{C1}$ of the first filter 210.

The memory 230 may store the extracted average $S_{C2}$. If the first filter 210 is omitted, the average $S_{C2}$ of the first dark pixels of each column may be extracted directly from the first dark pixels. Hereinafter, the average $S_{C2}$ of the first dark pixels of each column may be referred to as a "per-column dark offset".

The first average extractor 220 may extract the per-column dark offset value of the first dark pixels in each column of the first dark area 212 (or in one or both of the first dark areas 212a and 212b). In one example, the per-column dark offset value is extracted by averaging the first dark pixels in each column of the first dark area(s). In another example, the per-column dark offset value is extracted by weight-averaging the first dark pixels in each column of the first dark area(s).

The first average extractor 220 may extract a weighted average of the first dark pixels of a k-th row (e.g., by weight-averaging the first dark pixels of a [k−1]-th row, k being a natural number satisfying 1<k<n) row in each column of the first dark area 212 (or one or both of the first dark areas 212a and 212b) and the first dark pixels of the k-th row.

When the weighted average of the first dark pixels of the k-th row is extracted, a larger weighted value may be given to the weighted average of the first dark pixels of the (k−1)-th (k being a natural number satisfying 1<k<n) row than the first dark pixels of the k-th row.

The weighted average of the first dark pixels of the first row of each column of the first dark area 212 (or the first dark areas 212a and 212b) of a current frame may be a weighted average of the first dark pixels of the last row of each column of a previous frame.

The memory 230 may store the weighted average of the first dark pixels of the (k−1)-th (k being a natural number satisfying 1<k<n) row in each column.

The second average extractor 240 extracts an average $S_G$ of all of the first dark pixels in the first dark area 212 (or one or both of the first dark areas 212a and 212b) using the output of the first filter 210. For example, the second average extractor 240 may extract the average $S_G$ of all of the first dark pixels in the first dark area 212 (or the first dark areas 212a and 212b) of one frame from which the outlier(s) are removed by the first filter. Hereinafter, the average $S_G$ output from the second average extractor 240 is referred to as a "global dark offset value".

If the first filter 210 is omitted, the average $S_G$ may be extracted directly using the first dark pixels.

The selector 250 selects and outputs the per-column dark offset value $S_{C2}$ or the global dark offset value $S_G$ based on or upon the occurrence of one or more predetermined operational conditions.

Here, the predetermined operational conditions may include the illuminance and temperature of the environment surrounding the image sensor.

For example, if the illuminance of the environment surrounding the image sensor is higher than a predetermined threshold illuminance, the selector 250 may select and output the global dark offset value $S_G$, because the sensed signal components in the high-illuminance environment are large, and thus the influence of column fixed pattern noise is low. In this case, when the global dark offset value $S_G$ is selected, at least the first average extractor 220 may be turned off, making it possible to reduce power consumption in the image sensor.

In addition, when the temperature of the surrounding environment is higher than a predetermined temperature, variation in the dark current is relatively large, and thus the error from the estimated column fixed pattern noise may increase or be relatively large. Therefore, the selector 250 may select and output the global dark offset value $S_G$ when the temperature of the surrounding environment is higher than the predetermined threshold temperature.

In contrast, when the illuminance of the environment surrounding the image sensor does not exceed the threshold illuminance and/or the temperature of the surrounding environment does not exceed the threshold temperature, estimating and removing column fixed pattern noise may be sufficiently accurate and/or useful, and the selector 250 may select and output the per-column dark offset value $S_{C2}$.

In a first offset extractor according to one or more other embodiments, the first filter 210 may be omitted, the first average extractor 220 may extract the average $S_{C2}$ using the output $S_C$ of the first dark pixels instead of the output $S_{C1}$ of the first filter 210, and the second average extractor 240 may extract the global dark offset value $S_G$ using the outputs $S_C$ of the first dark pixels instead of the output $S_{C1}$ of the first filter 210.

The second offset extractor 502 extracts a per-row average based on an output $S_R$ of the second dark area 222 (or of one or both of the second dark areas 222a and 222b) and extracts a per-row noise value from the per-row average and the global dark offset value $S_C$ (e.g., by subtracting the global dark offset value $S_G$ from the extracted per-row average).

The second offset extractor 502 may include a second filter 260, a third average extractor 270 and a calculator or mathematical operator (e.g., an adder or subtractor) 280.

The second filter 260 filters the second dark pixels in each row of the second dark area 222 (or one or both of the second dark areas 222a and 222b) to obtain a median value of the second dark pixels in each row of the second dark area 222 (or one or both of the second dark areas 222a and 222b). For example, the second filter 260 may be or comprise a median filter.

For example, the second filter 260 may select a median (or representative) value from among the second dark pixels in each row (e.g., two or more second dark pixels adjacent to any one second dark pixel in each row) and output the median (or representative) value $S_{R1}$ of the second dark pixels in each row.

For example, the second filter 260 may select an output (e.g., Y1) of one second dark pixel (e.g., X[1]) of a group of dark pixels in each row, or of each row as a whole, as follows.

For example, the median value (e.g., 2) may be extracted from among the outputs (X[1]=1, X[2]=2, X[3]=3) of the second dark pixel (e.g., X[1]) and the next two second dark pixels (e.g., X[2] and X[3]) adjacent thereto, and the extracted median value (e.g., 2) may be changed to the output of the second dark pixel (e.g., X[1]). The number of selected adjacent second dark pixels may be two or more. In such a case, the median value is simply a filtered value, in which the value of a first dark pixel represents the value of each of a group of three or more contiguous dark pixels. Alternatively, the value of a second dark pixel (e.g., X[2]) may be compared to the values of the second dark pixels adjacent thereto (e.g., X[1] and X[3], where X[1]=1, X[2]=2 and X[3]=3 for example), and the extracted median value (e.g., 2) may be the median value of the second dark pixels (e.g., X[2]). Such median filtering operations can be performed on a row of second dark pixels or all dark pixels in a dark area (e.g., second dark area 222). Thus, there may be one or more median or representative second dark pixel values for each row of second dark pixels in a second dark area.

The second filter 260 may also remove any outliers from the second dark pixels in each row of the second dark area 222 (or one or both of the second dark areas 222a and 222b) and maintain the average, median or representative value of the second dark pixels in each row.

That is, the second filter 260 may serve to cancel random noise in the second dark pixels in each row of the second dark area 222 (or of the second dark areas 222a and 222b).

The third average extractor 270 may extract the per-row average $S_{R2}$ of the second dark pixels in each row of the second dark area 222 (or of the second dark areas 222a and 222b) from the output(s) $S_{R1}$ of the second filter 260.

For example, the outputs $S_R$ of the second dark pixels in each row may be filtered by the second filter 260 to provide the median values $S_{R1}$, and the third average extractor 270 may extract a per-row average $S_{R2}$ of the median values $S_{R1}$ of the second dark pixels in each row. Accordingly, the third average extractor 270 may extract the per-row average $S_{R2}$ corresponding to each of the rows of the second dark area 222 (or of one or both of the second dark areas 222a and 222b).

In another embodiment, the second filter 260 may be omitted. If the second filter 260 is omitted, the third average extractor 270 may extract the per-row average $S_{R2}$ directly using the outputs $S_R$ of the second dark pixels in each row.

The calculator (e.g., the adder or subtractor) 280 extracts a per-row noise value (RN) from the global dark offset value $S_G$ and the per-row average=$S_{R2}$ (e.g., by subtracting the global dark offset value $S_G$ from the per-row average $S_{R2}$ [RN=$S_{R2}$−$S_G$]). Alternatively, the calculator 280 extracts the per-row noise value (RN) by adding the per-row average $S_{R2}$ and the inverse of the global dark offset value $S_G$.

The calculator 503 outputs a final dark offset value $S_F$ from the per-row noise value RN and the output of the selector 250 (i.e., either the per-column dark offset value $S_{C2}$ or the global dark offset value $S_G$).

For example, the calculator 503 may add the output of the selector 250 (i.e., either per-column dark offset value $S_{C2}$ or the global dark offset value $S_G$) to the per-row noise value RN, and output the final dark offset value $S_F$ as the sum of the per-row noise value RN and either per-column dark offset value $S_{C2}$ or the global dark offset value $S_G$.

For example, depending upon the value output from the selector 250 (which may depend on one or more operational conditions of the image sensor, as described herein), the final dark offset value $S_F$ may be a sum of the per-column dark offset value $S_{C2}$ and the per-row noise value RN, or a sum of the global dark offset value $S_G$ and the per-row noise value RN.

For example, if the output of the selector 250 is the global dark offset value $S_G$, the final dark offset value $S_F$ may be the output $S_{R2}$ of the third average extractor 270.

The corrector 116 (see FIG. 5) reads and compares raw data (D-raw; hereinafter, referred to as "active pixel data code") of the active pixel area 205 with a reference code.

When the active pixel data code is greater than the reference code $S_K$, the corrector 116 converts the active pixel data code of the active pixel area 205 into the reference code $S_K$ and/or outputs the reference code $S_K$.

For example, the reference code $S_K$ may be a full code of resolution of the analog-to-digital conversion for the output of the pixel array 120.

In another example, the reference code $S_K$ may be a full code of resolution of the analog-to-digital conversion of the analog-to-digital conversion unit 130.

For example, the reference code $S_K$ may have a code value of $2^n$ and, if n=10, the value of the reference code $S_K$ may be 1024 (e.g., 1111111111).

If the active pixel data code is less than or equal to the reference code, the corrector 116 corrects the active pixel data code based on the final dark offset value $S_F$ and outputs the active pixel data code $S_M$ (hereinafter, referred to as "corrected pixel data code"), from which noise is cancelled.

Here, the active data code may be a digital data code from converting the analog outputs of the active pixel area 205 using the analog-to-digital conversion unit 130.

Figure 7:
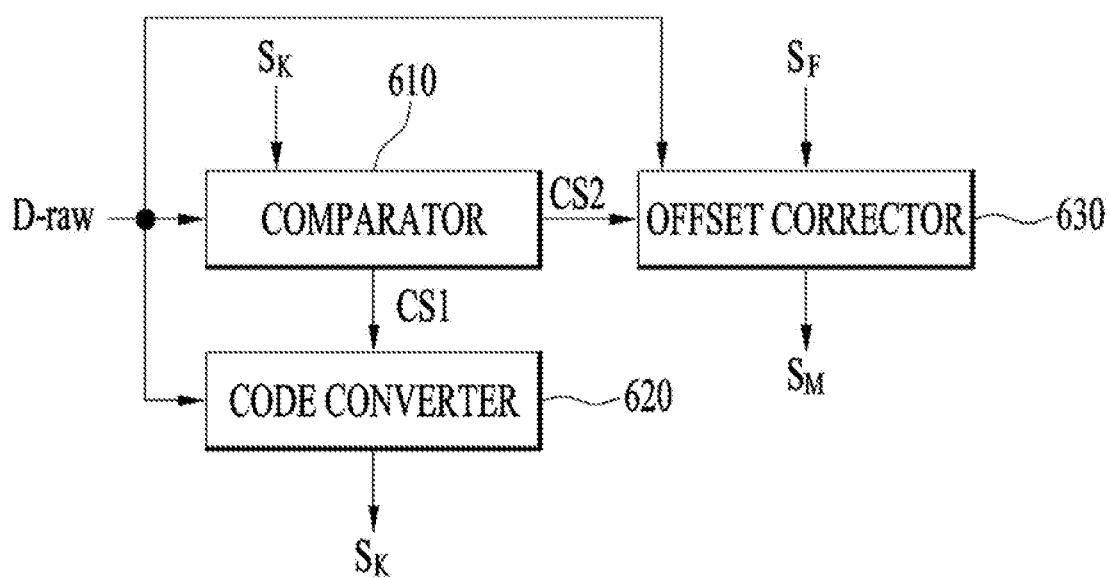
FIG. 7 is a diagram showing an exemplary configuration of an embodiment of the corrector shown in FIG. 5.

FIG. 7 is a diagram showing the configuration of an embodiment of the corrector 116 shown in FIG. 5.

Referring to FIG. 7, the corrector 116 may include a comparator 610, a code converter 620 and an offset corrector 620.

The comparator 610 reads the active pixel data code D-raw from in the memory 140, compares the active pixel data code D-raw with the reference code $S_K$, and outputs a first signal CS1 and a second signal CS2 based on the comparison.

The comparator 610 outputs the first signal CS1 or enables the first signal CS1 when the active pixel data code D-raw is greater than the reference code $S_K$ (D-raw>$S_K$).

The comparator 610 outputs the second signal CS2 or enables the second signal CS2 when the active pixel data code D-raw is less than or equal to the reference code $S_K$ (D-raw≤$S_K$).

The code converter 620 receives the active pixel data code D-raw from the memory 140, and either converts the active pixel data code D-raw into the reference code $S_K$ based on the value of D-raw and outputs the reference code $S_K$, or simply passes through the reference code $S_K$.

When D-raw>$S_K$, the corrector 116 outputs the reference code $S_K$ from the code converter 620 as the correction pixel data code of each active pixel without performing offset correction. Thus, it is possible to cancel the column fixed pattern noise (CFPN) and/or omit or disable its associated circuitry.

The offset corrector 630 receives the active pixel data code D-raw from the memory 140, corrects the active pixel data code D-raw based on the second signal CS2, and outputs the corrected data.

For example, the offset corrector 630 may correct the active pixel data code D-raw using the final dark offset value $S_F$.

When D-raw≤$S_K$, the corrector 116 performs offset correction through the offset corrector 630 and outputs the corrected data. For example, the corrector 116 may output a value obtained by subtracting the final dark offset from the active pixel data code D-raw as the corrected pixel data code.

In general, when the active pixel data code is corrected based on the dark offset, it is possible to cancel column fixed pattern noise and/or omit or disable its associated circuitry. However, the column fixed pattern noise may be generated in an area in which the screen of the image sensor is saturated by a bright subject.

Figure 8:
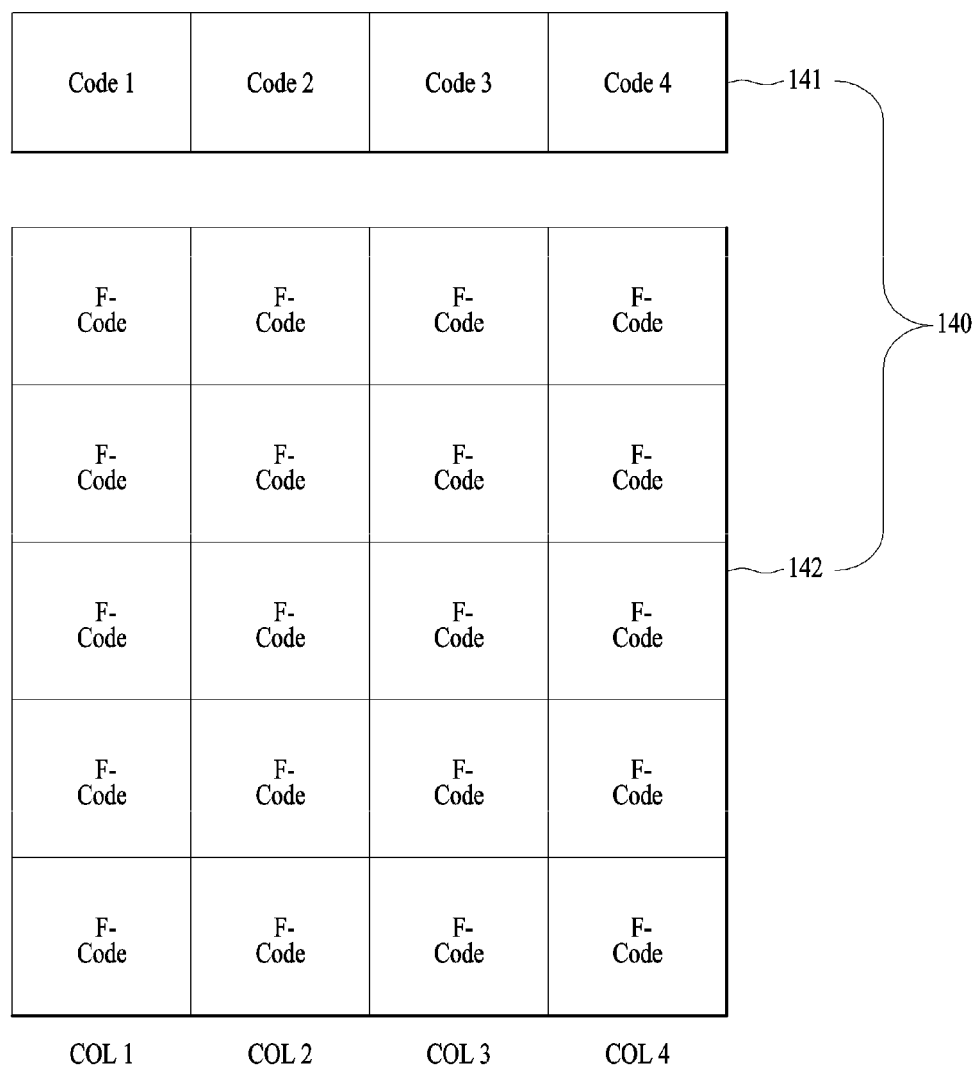
FIG. 8 is a schematic diagram illustrating causes of column fixed pattern noise in a bright area of a subject.

FIG. 8 is a schematic diagram illustrating causes of column fixed pattern noise in a bright area of a subject.

Referring to FIG. 8, the memory 140 may include a first memory area 141 configured to store dark pixel data codes and a second memory area 142 configured to store active pixel data codes.

The dark pixel data codes Code1 to Code4 (e.g., Code1, Code2, Code3, and Code4) of the dark pixels of first to fourth columns COL1 to COL4 (e.g., COL1, COL2, COL3, and COL4) may be stored in the first memory area 141 of the memory 140. The dark pixel data codes Code1 to Code4 may have independent and different values due to an independent offset of each column, and thus the final dark offsets of the columns may have different values.

The active pixel data codes of the active pixels in a plurality of columns of the image sensor that has sensed a bright area of a subject may be full codes (F-codes) and may be stored in the second memory area 142. As shown in FIG. 8, the per-column offsets of the active pixel data codes of the bright area of the subject may disappear.

The average dark pixel data codes may have a value of several tens (e.g., 10, 20, 30, 40, 50, 60, 70, 80, 90, etc.), which may vary according to column.

As a result, a difference between the active pixel data code and the dark pixel data code does not reach the full code, and column fixed pattern noise may be generated even when offset correction is performed. Offset connection comprises subtracting the dark pixel data code (or the final dark offset) from the active pixel data code.

In one embodiment, the analog-to-digital conversion unit 130 having (n+m)-bit resolution may be included to implement n-bit resolution.

In various embodiment, if the value of the active pixel data code of the active pixels exceeds the value of the full code generated by the analog-to-digital conversion unit having n-bit resolution, the active pixel data code exceeding the full code may be converted into the full code.

For example, in a 10.3-bit single slope analog-to-digital conversion unit, since the value of the full code of the active pixel is 1260, and the average of the dark pixel data codes of the dark pixels has a value of about several tens (e.g., 10 to 90), even when the value of the dark pixel data code varies according to the column, the column fixed pattern noise is not generated by the offset correction.

According to embodiments of the present invention, it may be possible to prevent column fixed pattern noise from being generated by an offset correction in the bright area of the subject.

Features, structures, effects, and the like as described above in the embodiments are included in at least one embodiment of the present invention and should not be limited to only one embodiment. In addition, the features, structures, effects, and the like described in the respective embodiments may be combined or modified even with respect to the other embodiments by those skilled in the art. Accordingly, contents related to these combinations and modifications should be construed as within the scope of the present invention.

What is claimed is:

1. An image sensor comprising:
   a pixel array including an active pixel area including active pixels and a dark pixel area including dark pixels;
   an analog-to-digital conversion unit configured to generate a dark pixel data code by converting an analog output of each of the dark pixels and an active pixel data code by converting an analog output of each of the active pixels;
   an offset extractor configured to extract a final offset using the dark pixel data code; and
   a corrector configured to correct the active pixel data code using the final offset,
   wherein the corrector outputs one of a corrected pixel data code and a reference code from a comparison of the active pixel data code and the reference code, and
   the corrected pixel data code is obtained by correcting the active pixel data code using the final offset.

2. The image sensor according to claim 1, wherein the reference code is a full code of resolution of the analog-to-digital conversion unit.

3. The image sensor according to claim 1, wherein the corrector is configured to convert the active pixel data code into the reference code and/or output the reference code when the active pixel data code is greater than the reference code.

4. The image sensor according to claim 1, wherein the corrector is configured to output the corrected pixel data when the active pixel data code is less than or equal to the reference code.

5. The image sensor according to claim 1, wherein the offset extractor is configured to extract (i) a per-column dark offset, a global dark offset and per-row noise using the dark pixel data code and (ii) the final offset using at least one of the extracted per-column dark offset, the global dark offset and the per-row noise.

6. The image sensor according to claim 1, wherein the analog-to-digital conversion unit is configured to generate a (n+m)-bit digital code, where n is a natural number greater than 1 and m is a rational number satisfying 0<m<1.

7. The image sensor according to claim 6, further comprising a memory configured to store the dark pixel data code and the active pixel data code.

8. The image sensor according to claim 7, wherein the memory is configured to provide an (n+1)-bit storage space configured to store the active pixel data code.

9. The image sensor according to claim 1, wherein the corrector includes:
   a comparator configured to compare the active pixel data code and the reference code and output a first signal and a second signal;
   a code converter configured to convert the active pixel data code into the reference code and/or output the reference code based on the first signal; and
   an offset corrector configured to correct the active pixel data code based on the second signal and output the corrected pixel data.

10. An image sensor comprising:
    a pixel array including an active pixel area including active pixels and a dark pixel area including dark pixels;
    an analog-to-digital conversion unit configured to generate a dark pixel data code by converting an analog output of each of the dark pixels and an active pixel data code by converting an analog output of each of the active pixels;
    a memory configured to store the dark pixel data code and the active pixel data code; and
    a digital signal processor configured to extract a final offset using the dark pixel data code and to correct the active pixel data code using the final offset,
    wherein the digital signal processor configured to output one of a corrected pixel data code and a reference code based on a comparison of the active pixel data code and the reference code, the corrected pixel data code is obtained by correcting the active pixel data code using the final offset, and the reference code is a full code of resolution of the analog-to-digital conversion unit.

11. The image sensor according to claim 10, further comprising a column scanner configured to generate control signals configured to control the memory, wherein, based on the control signals, the active pixel data code and the dark pixel data code in the memory are transmitted to the digital signal processor.

12. The image sensor according to claim 10, wherein the digital signal processor includes:

an offset extractor configured to extract the final offset using the dark pixel data code; and a corrector configured to output one of the corrected pixel data code and the reference code from a comparison of the active pixel data code and the reference code.

13. The image sensor according to claim 10, wherein the offset extractor is configured to extract (i) a per-column dark offset, a global dark offset and per-row noise using the dark pixel data code and (ii) the final offset using at least one of the extracted per-column dark offset, the global dark offset and the per-row noise.

14. The image sensor according to claim 10, wherein the analog-to-digital conversion unit is configured to generate an (n+m)-bit digital code, where n is a natural number greater than 1 and m is a rational number satisfying 0<m<1.

15. The image sensor according to claim 14, wherein the memory includes a (n+1)-bit storage space configured to store the active pixel data code.

16. The image sensor according to claim 12, wherein the corrector includes:

a comparator configured to compare the active pixel data code and the reference code and output a first signal and a second signal;

a code converter configured to convert the active pixel data code into the reference code and/or output the reference code based on the first signal; and an offset corrector configured to correct the active pixel data code based on the second signal and output the corrected pixel data.

17. A method of sensing an image using an image sensor including a pixel array including active pixels and dark pixels, the method comprising:

acquiring analog outputs of the dark pixels and analog outputs of the active pixels;

generating a digital dark pixel data code by converting each of the analog outputs of the dark pixels and generating a digital active pixel data code by converting each of the analog outputs of the active pixels using an analog-to-digital conversion unit;

extracting a final offset using the dark pixel data code; and correcting the active pixel data code using the final offset, wherein correcting the active pixel data code includes outputting one of a corrected pixel data code and a reference code as corrected pixel data based on a comparison of the active pixel data code and the reference code, the reference code is a full code of resolution of the analog-to-digital conversion unit, and the corrected pixel data code is obtained by correcting the active pixel data code using the final offset.

18. The method according to claim 17, wherein correcting the active pixel data code includes converting the active pixel data code into the reference code and/or outputting the reference code when the active pixel data code is greater than the reference code.

19. The method according to claim 17, wherein correcting the active pixel data code includes outputting the corrected pixel data code when the active pixel data code is less than or equal to the reference code.

20. The method according to claim 17, wherein generating the dark pixel data code includes generating an (n+m)-bit digital code, where n is a natural number greater than 1 and m is a rational number satisfying 0<m<1.

* * * * *